INVENTOR.
ALF GEORG SVÄRD
BY
Young + Thompson
ATTYS.

INVENTOR.
ALF GEORG SVÄRD
BY Young + Thompson
ATTYS.

United States Patent Office 3,484,941
Patented Dec. 23, 1969

3,484,941
ASPIRATION DEVICE, ESPECIALLY FOR
USE IN DENTAL PRACTICE
Alf Georg Svärd, Matrosvagen 6, Saltsjobaden, Sweden
Filed Dec. 12, 1967, Ser. No. 689,936
Claims priority, application Sweden, Dec. 13, 1966,
17,045/66
Int. Cl. A61c 17/04
U.S. Cl. 32—33
6 Claims

ABSTRACT OF THE DISCLOSURE

Dental aspiration device having aspirating mouthpieces at one or several stations of operation connected by flexible hoses to a common pipe line system, one end of which is connected to one or more fan assemblies and a collecting receiver, while the other end of the system connects with atmosphere. The receiver, which is automatically emptied, and the fan assembly or assemblies are located together apart from the station or stations of operation. The aspirated air is evacuated from the fan assembly or assemblies by an evacuation pipe and the fan motor or motors are cooled by a separate current of air. A magnetic valve is placed between the hose from each mouthpiece and the connection to the common pipe line system for shutting off the mouthpiece, and a filtering device is in turn placed in the line between each mouthpiece and its corresponding magnetic valve.

---

Figure 1:
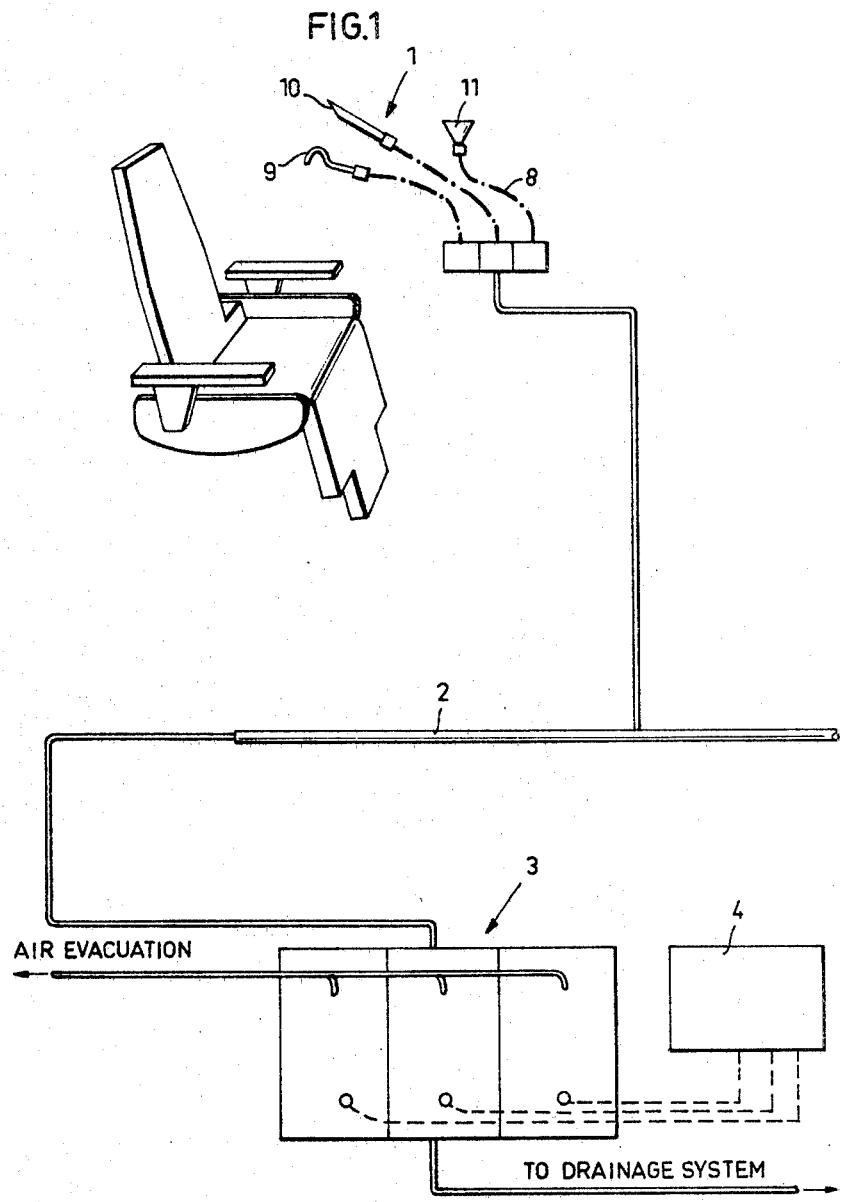

The present invention relates to an aspiration device especially for use in dental practice to evacuate saliva, blood, etc., during dental operations, said device being provided with aspirating mouthpieces, a fan assembly driven by one or several electric motors in order to provide the necessary vacuum for the aspiration, and a recipient device to collect the evacuated liquid or mixture of liquids, which recipient device can be emptied automatically.

Apparatus for the evacuation of saliva, blood, etc., during dental operations generally comprise a fan assembly, which by means of hoses is connected to the mouthpieces effectuating the aspiration. The evacuated liquid or mixture of liquids is collected in a glass receptacle, which is manually emptied. The fan assembly in principle is designed like a household vacuum cleaner with all its inherent inconveniences such high sound level and air exhaust into the ambient atmosphere of the premises. In some installations the fan assembly therefore has its location in a space far removed, whereby a lowering of the sound level in the operation room has been obtained. However, due to the buzzing noise from the mouthpieces, the sound level is nevertheless disagreeable to those exposed to said sound during a whole day's work. It is as a rule not possible to shut off the mouthpieces because of the fact that the electric fan motor has to be cooled by the air aspirated by said mouthpieces. The only practical solution hitherto existing is the one involving putting the motor out of operation, when it is possible with respect to the work.

By the automatization of the emptying of the glass receptacle one has succeeded in avoiding the unsanitary handling of the liquid or the mixture of liquids in the glass receptacle.

However, of late the demand for such aspiration apparatus has increased, and there is a desire to eliminate the noise from the fan, the buzzing noise from the air and an unsanitary handling of the collected liquid as well as the evacuated air. Also, the demand for a stronger suction effect has increased, this to a large degree depending upon the posture of the patient when using the so called sit-down practice. However, all these demands have led to more or less rational proposals for so called centralized and/or automatized installations for one or several stations of operation.

It is an object of the present invention to provide an aspiration device of the type mentioned in the preamble, which device does not exhibit the drawbacks of the devices of the prior art, and which in spite of an improved suction effect does not produce any irritating sound from the fan assembly or from buzzing air, but is practical and rational in use and permits a sanitary handling of the collected liquid as well as of the evacuated air.

According to the invention an aspiration device having these qualities and thus corresponding to the increased demand for improved aspiration equipment mentioned above, is foremost characterized in that the aspirating mouthpieces at one or several stations of operation are connected to one or several fan assemblies by means of flexible hoses, known per se, which in their turn are connected to a common pipe line system, one end of which is connected to the fan assembly or assemblies and the collection receptacle, while the other end of said system at least in part communicates with the ambient atmosphere, whereby the fan assembly or assemblies are located together with the collecting receptacle apart from the operation station or stations, the electric motors of the fan assembly or assemblies are as to their cooling unaffected by the aspirated air, which by means of an exhaust or evacuation pipe or hose is evacuated from the fan assembly or assemblies, said motors instead being cooled by means of a separate current of air, and in that a magnetic valve, known per se, is placed between the hose from each one of the aspirating mouthpieces and the connection to the common pipe line system for the station or stations of operation for the purpose of shutting off the mouthpiece, and a filtering device is placed in the line between each mouthpiece and its corresponding magnetic valve.

The filtering device is in part used in order to avoid interference with the function of the corresponding magnetic valve because, by way of example, amalgam residues and similar impurities otherwise might form a deposit on the valve surfaces and make difficult or totally impede the complete shutting off of the valve, and in part said filtering device has as a function to impede said impurities from clogging the piping system itself after a certain time.

In an especially suitable embodiment of an aspiration device in accordance with the invention the filter device comprises a housing in which a filtering or screening device is inserted, which device can be removed for cleaning. The filtering device and the magnetic valve corresponding to one or several mouthpieces at one and the same station of operation may to advantage be incorporated into a unit placed on a collection pipe connected to the common pipe line system, and said unit is provided with a number of connecting nipples for coupling the hoses corresponding to the number of mouthpieces.

In an aspiration device or apparatus according to the invention the aspirating mouthpieces in their rest position are suitably placed in a pivotable and rotatable mouthpiece holder in which the hoses are guided over a curved surface to the end that they by their own weight automatically adjust themselves to follow the curvature of the curved surface. The holding device is then preferably placed on or close to the dental chair, by which arrangement the aspirating mouthpieces will be readily at hand irrespective of the patient occupying a lying down or sitting posture and of the dentist having a sitting or standing posture. In addition to mouthpieces and hand-held cuspidor cup or funnel being thus readily at hand, the sanitary advantage is obtained that suction tools of the aspiration device, which in its entirety should be regarded as a waste disposing apparatus, will not at all intermingle with the dentist's drills, water syringe etc., which otherwise is not uncommon. By the holder unit of the mouthpieces of the aspiration device having been designed to the mentioned end, the suction mouthpieces as well as the cuspidor cup or funnel may be handled from an operation point of view in the correct and most efficient manner.

An aspiration unit according to the invention also makes the otherwise common cuspidor bowl an obsolete feature, as also the ordinary drainage system including the floor outlet and the like. The connections to the aspiration device by which each one can be shut off independently, are also an advantageous solution pointing to the fact that the dimensions and capacity of the aspiration equipment can be reduced because of the added effect produced by a number of dentist's aspiration devices being connected to the same evacuation system.

Figure 2:
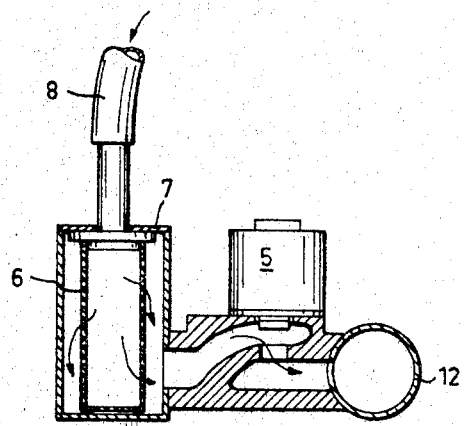
Figure 3:
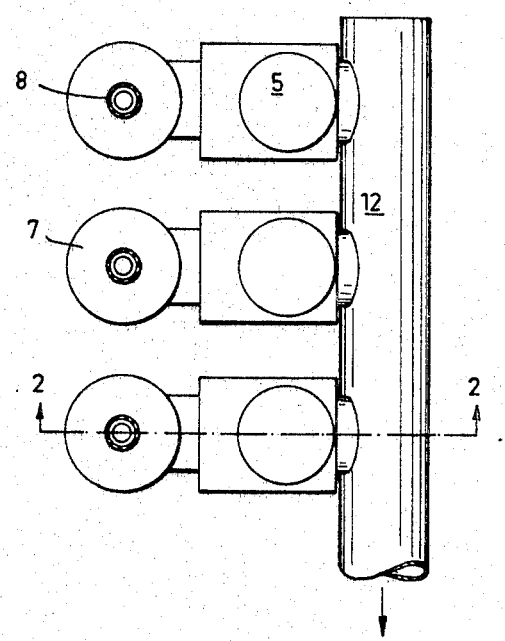
Figure 4:
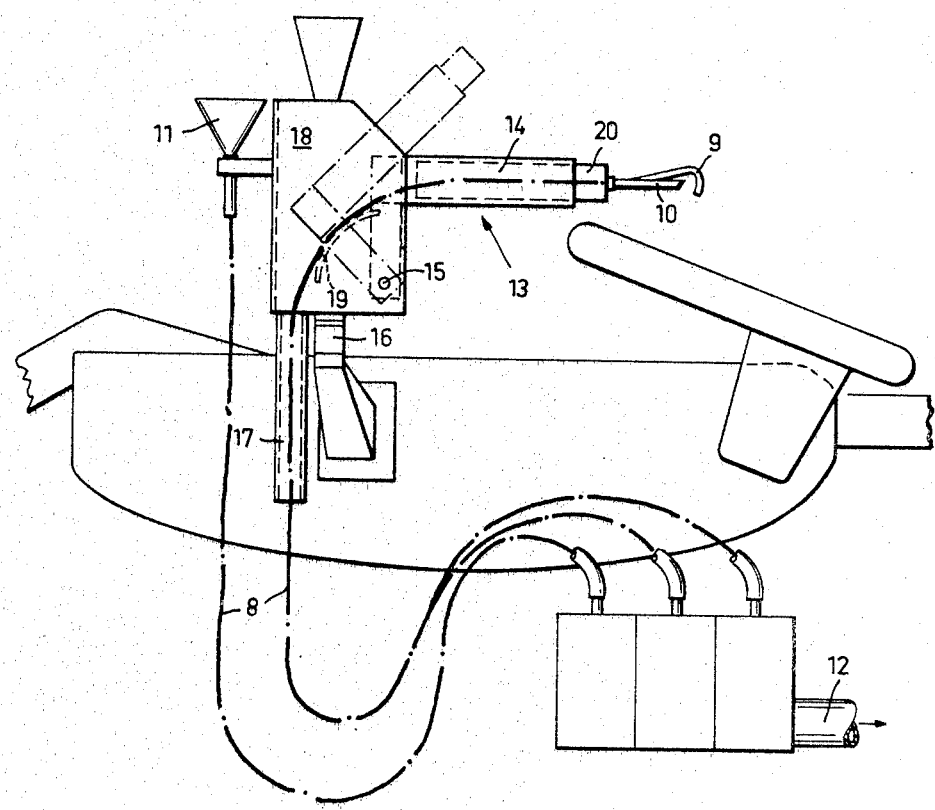
Figure 5:
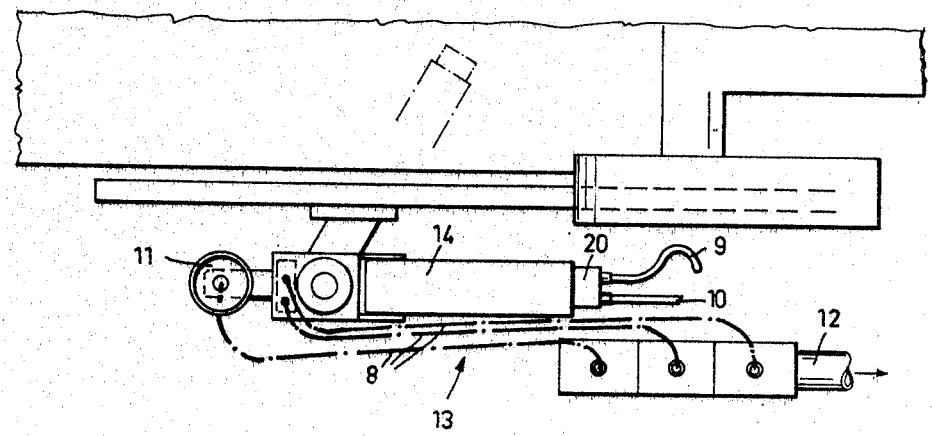

The invention is further explained by an embodiment shown in the accompanying drawing, in which:

FIG. 1 schematically illustrates the principal design of an aspiration device according to the invention, FIG. 2 is a cross-sectional view taken on the line 2—2 in FIG. 3, through a unit incorporating the filtering means and the magnetic valves of several mouthpieces at the same station of operation, FIG. 3, is a top plan view of the unit illustrated in FIG. 2, and FIGS. 4 and 5 show the principal design of the mouthpiece holder, as seen from one side and from above, respectively, attached to one side of a dentist's chair, whereby the pivoting capacity of the holder is indicated in FIG. 4, where the holder bracket by means of dashed, dotted and continuous lines is illustrated in two different positions.

As is evident from FIG. 1 a number of stations of operation have their aspiring mouthpieces 1 connected to a common pipe line system 2, which is connected to remote fan assemblies 3, which fan assemblies are controlled by an automatic device 4 for emptying of the receiver for liquids. As the motors driving the fans are cooled by a separate current of air, the suction mouthpieces at all stations of operation can be shut off, while the vacuum condition in the pipe line system is maintained without any risk of motor damage. The shutting off of the mouthpieces 1 is performed individually for each of them by means of a magnetic valve 5, FIGS. 2 and 3. In order to protect said magnetic valve and also the pipe line system against clogging, the valve is incorporated into a unit together with a simple filter device 6. The design in question is especially clearly shown in FIG. 2. As is evident from this figure, the filtering device 6 is easily taken out after removal of lid 7, to which hose 8 from one of the mouthpieces 1 is connected. Filtering device 6 collects amalgam and other solid waste products from a patient's mouth during a dental operation.

As a rule three suction hoses 8 are required, one for the saliva evacuator 9, i.e., the aspiration device placed in the mouth of the patient during the dental operation, another hose for a mouthpiece 10 for the purpose of removing waste material produced during the drilling operation, liquids in larger quantities etc., which usually is handled by the dental nurse, and finally a third hose for a hand-held cuspidor cup or funnel 11, which more and more replaces the cuspidor bowl. For this reason, three valves 5 incorporated with filtering device 6 are shown in FIGS. 2 and 3. Only the mouthpiece 1, which is in use, has the vacuum connected, by which arrangement unnecessary noise from buzzing air is avoided, at the same time that the vacuum condition of an aspiration device is improved. By the incorporation into one unit of filtering device 6 and valve 5 corresponding to an individual mouthpiece, and by several evacuation outlets subsequently being connected to a common collection pipe 12, the fall of pressure in such an assembly has been reduced to tolerable proportions without having to resort to disproportionately bulky dimensions. Each of the magnetic valves is operated by means of a micro switch, not shown, which is actuated when the respective mouthpiece is taken out of the holder, or else by means of a suitable circuit closure means.

It has been evident from measurements of pressure drop carried out in connection with the design work of the device that the pressure drop in the hoses 8, by which mouthpieces 1 are connected to the pipe line system, is comparatively great, taking into consideration the required air ventilation and the available vacuum. It is therefore necessary to give hoses 8 the shortest possible length in order to obtain optimum suction effect.

In the aspiration devices of the prior art the mouthpieces together with their hoses generally are hung up on the aspiration unit, which as a rule is housed in a mobile cabinet close to the place of operation. While the operation is going on they are therefore not as accessible as they should be.

It is also known to place the mouthpieces in a unit or holder to which the air driven drills used by the dentist then are connected, said unit also serving as support device for the drill equipment. The installation to guide the hoses in such a unit is, however, usually a complicated matter, as it comprises bobbins and counterweights to keep the hoses stretched and to bring them back from a drawn out position to their rest position. The length of the hose and its guiding also contributes to the pressure drop in such an installation, which is too large, whereby the vacuum at the mouthpiece end tends to be unsatisfactory.

In order to eliminate the inconveniences mentioned an aspiration device according to the invention therefore suitably comprises a holder 13, which serves only to support the mouthpieces and the hoses. The construction principle of this so called aspiration unit or holder 13 can be seen from FIGS. 4 and 5. From these figures it is evident that the holder 13 is designed so that the hoses 8 are conveyed through it in the simplest possible manner. Hoses 8 are not urged to be bent but just take on their natural radius or curvature, which is determined by experiment. Said curvature is maintained independently of the direction of the holder bracket 14, when said bracket is pivoted around a pivot 15. The whole of the holder 13 is rotatable around a pivot 16, which, however, does practically nothing to guide the hose influence on the hose guiding. By this arrangement unnecessary strain is avoided on the hoses 8, and the operation of bringing them back to rest position from a drawn out position can now take place by their own weight. This is of great importance as seen from the viewpoint of rational operation conditions.

The holder 13 moreover comprises a vertical housing 17 in which the hoses 8 are led to a substantially rectangular box 18. In box 18 is a plate 19 bent in arcuate form, which plate in FIG. 4 is only schematically indicated by dashed and dotted lines. The radius of curvature of plate 19 matches the radius of the natural curvature of the hoses 8 determined by experiment and thus gives them support without deforming them. The holder bracket or hose guide 14 is pivotable in a vertical plane apart from box 18, and said holder bracket is provided with a holding device 20 for the mouthpiece. The holder bracket or hose guide can be telescopically prolonged at the same time as the hoses 8 can be drawn out of it. By this arrangement mouthpieces 1 can have a common rest position during the operation, and hoses 8 are always orderly arranged. The holder bracket or hose guide 14 is pivotable around a pivot 15 which is the centre of the circular curvature of plate 19.

What I claim is:

1. Aspiration apparatus for use in dental practice, comprising a continuously running fan assembly driven by a continuously operating motor, a pipeline system communicating at one end with said fan assembly and communicating at the other end continuously with the atmosphere to provide a continuous air intake for said fan assembly, means for receiving liquid drawn through said pipeline system by said fan assembly, an aspirating mouthpiece, conduit means by which said aspirating mouthpiece is connected to said pipeline system between said ends of siad pipeline system, and valve means in said conduit means between said aspirating mouthpiece and said pipeline system for establishing and interrupting communication between said aspirating mouthpiece and said pipeline system.

2. Apparatus as claimed in claim 1, there being a plurality of said conduit means communicating with said pipeline system between said ends of said pipeline system, said conduit means having aspirating mouthpieces disposed at different dental operating stations.

3. Apparatus as claimed in claim 1, said valve means comprising magnetic valve means.

4. Apparatus as claimed in claim 1, and filter means disposed in said conduit means between said aspirating mouthpiece and said valve means.

5. Apparatus as claimed in claim 4, in which said filter means and valve means are mounted together as a unit in said conduit means, said conduit means including a flexible conduit extending between said aspirating mouthpiece and said filter means.

6. Apparatus as claimed in claim 1, and a holder for said aspirating mouthpiece, means mounting said holder for vertical swinging movement and horizontal swinging movement about spaced axes, said holder having a surface curved over a long radius of curvature, said conduit means including a flexible hose between said aspirating mouthpiece and said valve means, said flexible hose extending over said curved surface.

References Cited

UNITED STATES PATENTS 3,138,873  6/1964  Bishop _____ 32—33

ROBERT PESHOCK, Primary Examiner